Sept. 30, 1969          A. L. MORSE          3,470,461

CRYOGENIC FLUX-GATING MAGNETOMETER

Filed July 10, 1967

Arthur L. Morse
INVENTOR.

BY
Donald C. Heaveney
ATTORNEY

United States Patent Office 3,470,461
Patented Sept. 30, 1969

3,470,461
CRYOGENIC FLUX-GATING MAGNETOMETER
Arthur L. Morse, Los Angeles, Calif., assignor to TRW Inc., Redondo Beach, Calif., a corporation of Ohio
Filed July 10, 1967, Ser. No. 652,244
Int. Cl. G01r 33/02, 33/04
U.S. Cl. 324—43     4 Claims

ABSTRACT OF THE DISCLOSURE

There is disclosed herein a flux-gate magnetometer of improved sensitivity over previously known devices of this type. In the present device gating regions in a thin film of superconductive material are deposited on an element which acts as a heat sink in order to improve switching speed. Further, the superconductive gating regions are made very small and are surrounded by effectively individual pickup coils so that the flux increase around their perimeter when superconducting is small. The individual superconducting region should be of the approximate size and shape of a natural domain under the design conditions. The sensor then consists of a mosaic containing a large number of such small regions each surrounded by a pickup coil. The magnetic drive field is made as precisely parallel to the surface on which the superconducting regions are deposited as is possible in order to maximize the domain size. This may be accomplished, for example, by using a parallel high speed superconducting film as the driving element. Undesired capacitive coupling between the drive and pickup system is eliminated by using an intermediate ground electrostatic shield. The device is operated at cryogenic temperatures and the magnitude of the drive field is such as to switch the detector in and out of the superconducting state to thereby gate the ambient magnetic flux. This gating action affords a measure of the ambient magnetic flux in a manner which will be explained in detail below.

CROSS REFERENCE TO RELATED APPLICATIONS

This invention is an improvement over the invention disclosed and claimed in U.S. Patent application Ser. No. 417,584, filed Dec. 11, 1964, and titled, "Superconductive Fluxgate Magnetometer," by George T. Inouye and Darrell L. Judge, which is assigned to the same assignee as is the present application.

BACKGROUND OF THE INVENTION

A conventional flux-gate magnetometer consists of a saturable, high permeability core with a drive coil and a pickup coil wound around it. The drive coil is used to drive the core into saturation alternately in the two opposite directions along the core axis. The flux lines threading through the pickup coil, then, are the sum of those created by the drive coil and those due to the ambient magnetic field. Since the drive coil saturates the core alternately in the two directions colinear with the core axis, the contributions of the ambient flux to the total flux threading the pickup coil is negligible except at the times at which the sense of saturation is reversing; that is, except when the ambient flux is "gated on" exactly at the cross-over time or the times on the flux versus time curve when the flux B crosses the time axis. The effect of the ambient flux is to shift the crossover instants. When the ambient field is zero, the crossover instants are evenly spaced and this symmetry is upset by the ambient flux when the ambient field is other than zero. In that case, the cross-over points on the negative half cycle on the flux versus time curves are wider spaced than those on the positive half cycle. The curve of flux B versus time with $H_A=0$ contains only even harmonics, whereas the curve with $H_A$ present contains odd harmonics as well as even harmonics. One disadvantage of the conventional flux-gate magnetometer is that it is limited in accuracy, as opposed to sensitivity, by the remnant magnetization of the core, which introduces an uncertainty in the zero level. Another disadvantage is the limitation placed on the sensitivity by certain sources of noise such as the resistance of the output coil, the reflected resistance from the drive coil, and the Barkhausen noise in the core material.

In order to overcome these problems the superconductive flux-gate magnetometer of the above referenced application Ser. No. 417,584 was developed. The present invention is the result of continued research and affords certain improvements thereover.

In the device disclosed in application Ser. No. 417,584 there is provided a superconductive surface between an ambient magnetic field to be measured, such as the earth's magnetic field, and a pickup means oriented to respond to the component of ambient magnetic field normal to the superconductive surface. The superconductive surface extends a sufficient distance beyond the extremities of the pickup means to exclude an appreciable number of flux lines of the ambient magnetic field from the pickup means when the superconductive surface is in a superconducting state. In its non-conductive state, the surface transmits the flux lines of the ambient magnetic field.

Means are provided for establishing a superconducting state in the superconductive surface. Means are also provided for causing the entire area of the superconductive surface to alternate between the superconducting and normal states at a given frequency so as to alternately expose and shield the pickup means from the ambient magnetic field. In this way the ambient magnetic field is chopped by the periodic changes in the state of the superconductive surface. The chopping frequency is detected by a detector tuned to a harmonic of the chopping frequency to derive an output signal representative of the normal component of the ambient magnetic field.

In the operation of this device, a very small fraction of the flux passing through the search coil is gated out when the element becomes superconducting. This has been found to be due to the complex growth of the superconducting domains, resulting in most of the flux being trapped rather than excluded. This can be understood as follows: because of the increase in magnetic field strength around the perimeter of an area where flux has been excluded by the Meissner effect, such areas tend to be self-limiting in size. Other domains are formed where the field is weaker and eventually surround regions of high flux so they are not switched out of the pickup monitored area.

Secondly, in the above-referenced device the maximum drive frequency is limited by the thermal time constant associated with the flow of latent heat of the superconducting transition to and from the gating element. It is also limited by currents that are induced in the gating element when the field is changed rapidly.

The device of the present invention minimizes the loss in sensitivity due to such incomplete gating and allows for much higher switching speeds than is otherwise attainable.

It is therefore an object of this invention to provide an improved cryogenic flux-gating magnetometer having greater sensitivity and operating at higher frequencies than has heretofore been attainable.

SUMMARY OF THE INVENTION

Both the above referenced device and the improved device of the present invention make use of the Meissner effect in superconductors to gate the flux passing through a search coil. The gating element comprises superconducting material which is placed across the face of the coil so that all flux threading the coil must penetrate the gating element. When the superconducting material is in "normal" state, the flux through the coil is given by $\vec{B}\cdot\vec{A}$, where $\vec{A}$ is the area of the coil. When the gating element is in the superconducting state, part of this flux is excluded due to the Meissner effect. The transition between these two states is caused by varying either the temperature of the gating element, or the magnetic field surrounding the element. This gating field is preferably applied perpendicularly to the coil axis so as to produce no EMF in the search coil.

The limiting factors on sensitivity of the above-referenced device are obviated in the present instance by making the gating regions very small, preferably of the approximate size and shape of a natural domain. The sensor consists of a mosaic containing a large number of such regions each surrounded by a pickup coil. The drive field is made as precisely parallel to the surface of this film or mosaic as is possible in order to maximize the domain size. The latent heat associated with the gating superconducting transition is finite because of the presence of the magnetic field. Therefore, the switching element or mosaic film is coupled with high thermal conductivity to a heat sink at the design temperature. Undesired capacitive coupling between the drive and pickup system is eliminated by using an intermediate ground electrostatic shield. Circulating currents induced in various components which tend to prevent the drive and measured field from changing rapidly are inhibited by suitable selection of materials and by lamination. The construction and operation of the device will be apparent from the detailed description below.

DESCRIPTION OF THE PREFERRED EMBODIMENT

Figure 1:
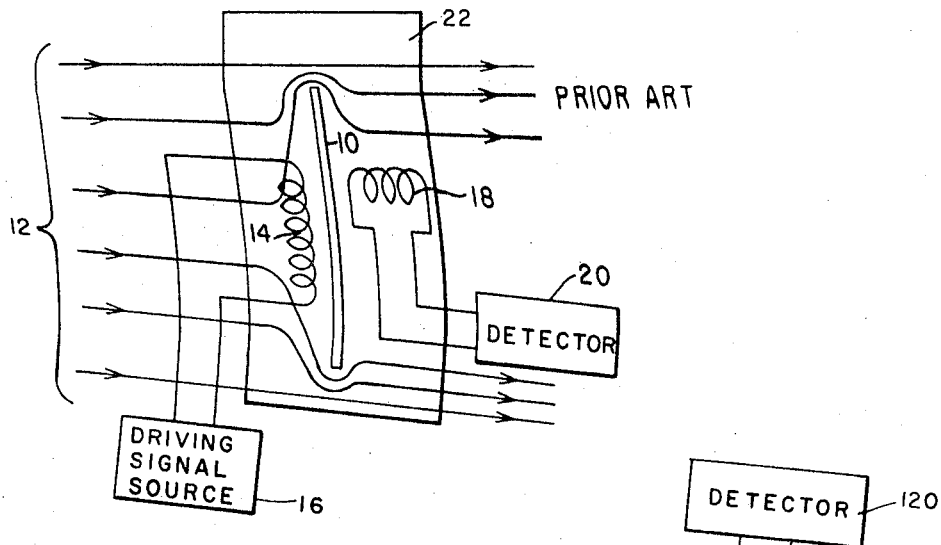
FIGURE 1 is a schematic diagram illustrating the principles of operation of the device disclosed in the above-noted, copending application.

FIGURE 1 is a schematic view illustrating the prior art device disclosed in the above-noted, copending application. In that type of superconductive flux-gate magnetometer a sheet or surface 10 of superconductive material is disposed within a magnetic field originating on one side of the superconductive surface 10. The magnetic field to be measured is represented by magnetic flux line 12 emanating from a direction normal to the superconductive surface 10.

A driving means such as a coil 14 is mounted adjacent to the side of the superconductive surface 10 that is exposed to the magnetic flux line 12. A source of driving signals such as an alternating current source, is connected to the driving coil 14. The driving signal source 16 supplies an alternating current of sufficient magnitude to create an alternating magnetic field (not shown) about the driving coil 14 that drives the entire volume of the superconductive surface 10 alternately between the normal and superconducting state.

A pickup means such as a pickup coil 18 is mounted adjacent to the superconductive surface 10 on the opposite side thereof from the driving coil 14. A detector 20 is coupled to the pickup coil 18. As the superconductive surface 10 is driven alternately between the normal and superconducting state by the driving coil 14, the pickup coil 18 will be periodically exposed to portions of the magnetic flux line 12. The pickup coil 18 is oriented with its axis parallel to the magnetic flux lines 12 so that it will cut the flux lines passing through the superconductive surface 10 when it is in the normal state. Accordingly, an alternating voltage is developed in the coil 18. The detector 20 is tuned to the frequency of alternation in the superconductive surface 10 to maximize the voltage signal developed in the pickup coil 18.

In order to maintain the superconductive surface 10 at a sufficiently low temperature to place it in the superconducting state, the superconductive surface is mounted in a cryostat 22 such as a Dewar flask of liquid helium or other suitable coolant. If desired, the driving coil 14 and pickup coil 18 may also be made of superconductive material and placed in the cryostat 22.

The device operates in the manner indicated above by analyzing the output from signal coil 18 and detector 20 as the sheet 10 is driven alternatively into and out of superconducting state. As shown in FIGURE 1, the sheet 10 is in a superconductive state and serves as a magnetic shield for the pickup coil 18. When the sheet 10 is in its nonconductive state, the magnetic flux lines pass straight through it and link with the pickup coil 18, thereby inducing an EMF in the coil which produces an output from detector 20. As noted above, the effect of the ambient magnetic field superimposed on the alternating field generated by the driving signal source 16 is to shift the zero crossing points on the flux-time axis. It is an analysis of this phenomenon which is used to derive a measurement of the field from the detector signal as is described in greater detail in copending application Ser. No. 417,584.

Figure 3:
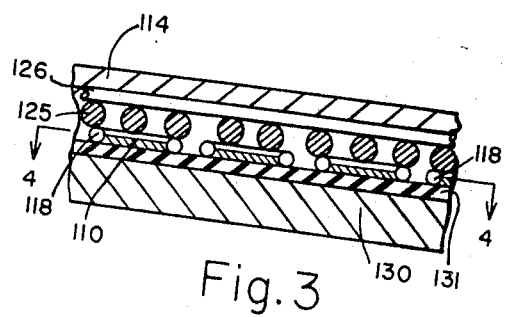
FIGURE 3 is an enlarged fragmentary view of the magnetometer element per se as seen in FIGURE 2.
Figure 2:
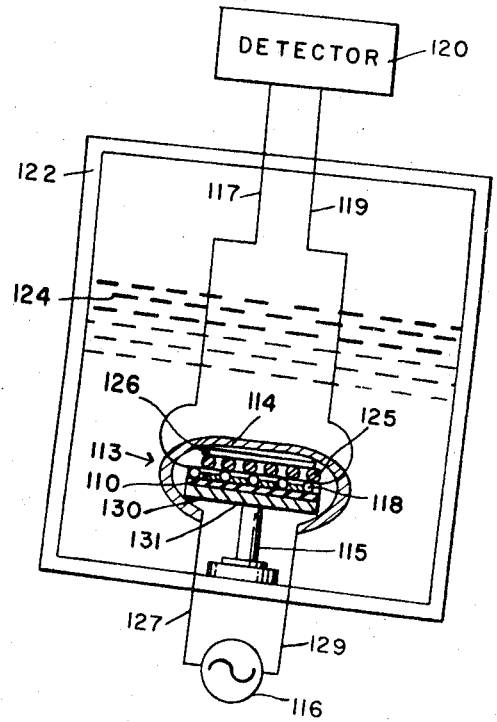
FIGURE 2 is a partially schematic cross-sectional view illustrating the device of the present invention.
Figure 4:
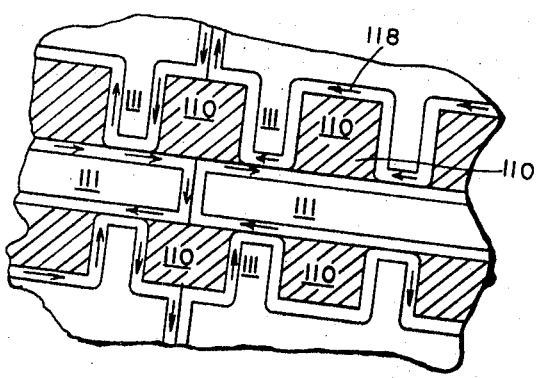
FIGURE 4 is a sectional view taken on the line 4—4 in FIGURE 3.

FIGURES 2, 3, and 4 illustrate the improved flux-gate magnetometer of the present invention. Like the device of FIGURE 1, the apparatus is immersed in a cryogenic container 122 which may, for example, be a Dewar flask. The magnetometer itself is indicated generally by the reference character 113 and is mounted on a pedestal 115 which is attached to the bottom of Dewar flask 122. The Dewar flask 122 contains liquid helium 124 or any other suitable coolant appropriate to the design temperatures.

The magnetometer 113 is provided with output leads connected to a detector 120. The output leads may be brought through the top or any other portion of the Dewar flask in any conventional manner. A driving signal source 116 also has leads connected through a wall of the Dewar flask to a drive film 114 which in the present instance is preferably a continuous super-conducting film rather than a coil.

The magnetometer 113 is built as a unitary structure upon a heat sink 130 which serves as its base. A plurality of pickup coils 118 surround the individual mosaic superconductive regions 110 as will be described in greater detail below. An electrostatic shielding structure 125 is interposed between the drive film 114 and the sensing elements 110–118. The heat sink 130 may be afforded a controlled thermal path through the pedestal 115, if necessary.

The general characteristics and properties of superconducting materials are well known and have been described not only in the above referenced copending application but also in an article entitled, "Advances in Superconducting Magnets," by William D. Samson, Paul P. Craig and Myron Strongin, which appeared at pages 114–123 of the March 1967 issue of Scientific American. A detailed discussion of superconductivity will therefore not be undertaken herein. It is pointed out, however, that the superconducting elements 110 are preferably a type I superconductor. More specifically, it is preferred to make this element of a thin evaporated film of tin. The heat sink 130 is preferably a copper slab which is first cut to the desired size and a reasonably substantial thickness and then has a layer of aluminum dioxide ($AlO_2$) evaporated on the top surface thereof. This insulating layer is indicated in FIGURE 3 by the reference character 131. For convenience, this layer is shown in FIGURE 3 to an exaggerated scale.

The next step in the processes of manufacturing the magnetometer is to position the enameled copper wire to, form pickup coils 118. These coils are formed generally in the configuration shown in the plan view in FIGURE 4. Essentially, the wire forms a single loop pickup coil surrounding each of the superconducting domains 110. The ends of the arrangement of coils are brought out through output leads 117 and 119 to connect to detector 120. The individual wire loops or pickup coils may be attached to the aluminum dioxide layer 131 by any suitable adhesive means.

Next, the thin film layer of tin is deposited by vacuum evaporation techniques to form the superconducting domains 110 within the areas defined by the pickup coil loops 118. Thereafter, an electrostatic shielding structure 125, comprising a plurality of enameled copper wires connected at one end by a buss bar 126, is adhesively attached over the sensing element 110–118.

Finally, a thin sheet of niobium or niobium tin alloy, which is a type II superconductor, is wrapped around the sandwiched assembly formed by the copper heat sink 130, the sensing element 110–118, and the electrostatic shield 125 in such a manner as to enclose this multilayer structure as shown at 114 in FIGURES 2 and 3. The ends of superconducting film 114 may be physically attached to the bottom side of the heat sink 130 and from this point of attachment input conductors 127 and 129 supply an alternating electromagnetic force from the drive signal source 116. This electrical input is used to generate the driving magnetic field which gates the ambient magnetic field into and out of the detecting coil-film surface 110–118.

With respect to general principles of operation, the fluxgate magnetometer of FIGURES 2, 3 and 4 operates broadly in the same manner as that of FIGURE 1 and as described in the above-noted copending application. The specific features of difference leading to the improved results are as follows:

The gating regions 110 are made very small so that the flux increase around their perimeter, when superconducting, is small. In a preferred device, these areas are typically squares of approximately one-half millimeter on each side. In principle, the individual superconductor regions should be of the approximate size and shape of a natural domain under design conditions. The sensor, as noted above, consists of a mosaic containing a large number of such regions 110 each surrounded by a pickup coil configuration 118. As the gating areas are made smaller, the gating efficiency has been shown to increase and it approaches one as gating area approaches the size and shape of a single domain.

The drive field is made as precisely parallel to the surface of this thin film sensor as is possible in order to maximize the domain size. This is accomplished, for example, by using the primarily parallel positioned thin superconducting film 114 as the driving element for generating the driving magnetic field in response to signals from the drive power source 116. The driving magnetic field, of course, gates the sensor elements into the magnetically conductive and magnetically nonconductive state as discussed above. The ambient field to be measured is applied perpendicularly to the plane of the sensing film 110–118 and to the directions of the drive field which is parallel to the film. Thus, when the elements 10 are placed in a superconductive state by the drive field, they will not transmit the ambient field. When elements 110 are not superconductive, they will transmit the flux lines of the ambient field and at the transition a voltage will be induced in pickup coil 118.

Each gating element 110 is surrounded by its individual pickup coil 118 made of enameled copper wire or alternatively, of a high field superconductor, in such a way that essentially all of the gating element is enclosed and none of the area between the elements is enclosed. Such an arrangement is shown in plan view in FIGURE 4, where the elements 110 are enclosed and the intervening areas 11 are not fully enclosed by pickup coils. This can be considered equivalent to putting tiny pickup loops around each gating element and hooking them in series adding.

The latent heat associated with the gating superconducting transition is finite because of the presence of a magnetic field. Therefore, the switching element 110 is coupled with high thermal conductivity to the heat sink 130. Otherwise the switching speed is severely limited as well as the domain size, since the rate of domain growth also depends on the supercooling. Undesired capacitive coupling between the drive and pickup system is eliminated by using the intermediate ground electrostatic shield system 125–126 as described above. Circulating currents induced in various components which tend to prevent the drive and measured field from changing rapidly are inhibited by the above noted selection of materials and the lamination technique of constructing the device.

This structure has been found to improve switching time by improving the thermal time constant of the device and to minimize losses in sensitivity due to incomplete gating by so shaping each element as to approximate a natural superconducting domain. The structure of the device also greatly reduces induced eddy currents.

What is claimed is:

1. A cryogenic superconductive flux-gating magnetometer, comprising:
   (a) a heat sink;
   (b) a plurality of separate areas of superconductive film in thermal contact with said heat sink;
   (c) pickup coil means surrounding each of said areas of superconductive film and being connected in series adding relationship;
   (d) means to maintain said film areas at a cryogenic temperature;
   (e) means to generate a driving magnetic field to drive said superconductive film areas into and out of the superconducting state;
   (f) and detector means for analyzing the output from said pickup coils as a measure of the ambient magnetic field in which said superconductive areas are positioned.

2. A cryogenic superconductive flux-gating magnetometer, comprising:
   (a) a heat sink;
   (b) a plurality of areas of superconductive film in thermal contact with said heat sink, each of said areas having approximately the size of a natural superconductive domain in said film;
   (c) pickup coil means surrounding each of said superconductive areas and being connected in series adding relationship;
   (d) means to maintain said apparatus at a cryogenic temperature to permit said film to be driven into and out of the superconductive state;
   (e) means to drive said areas of superconductive film alternately into and out of the superconductive state to thereby gate the ambient magnetic flux through said pickup coils; and
   (f) means to detect the signal output from said pickup coils as a measure of said ambient magnetic field.

3. A cryogenic superconductive flux-gating magnetometer, comprising:
   (a) a copper slab dimensioned to form a heat sink;
   (b) a plurality of areas of type I superconductor film in thermal contact with but electrically insulated from said heat sink, each of said areas comprising a film of approximately the size of a natural superconductive domain;
   (c) a single loop conductive pickup coil surrounding each of said areas, all of said coils being connected in series adding relationship, said plurality of areas and coils forming a sensing mosaic on said slab;
   (d) means to maintain said film at a cryogenic temperature permitting it to be driven into and out of the superconducting state;

(e) a thin film of a type II superconductor surrounding said copper slab and said sensing mosaic thereon so as to generate a magnetic field parallel to the plane of said sensing mosaic;

(f) means to electrostatically shield said surrounding thin film superconductor from said sensing mosaic;

(g) means to apply a drive voltage to said surrounding superconductive film to generate a magnetic field to drive said sensing areas into and out of the superconductive state alternately so as to gate flux from an ambient magnetic field through said pickup coils;

(h) means to detect the signal generated in said pickup coils as a measure of said ambient magnetic field.

4. Apparatus as in claim 3, wherein each of said superconductive areas is approximately 1 millimeter square, wherein said superconductive sensing film of said areas consist of tin, and wherein said thin film superconductor for generating said drive field comprises niobium.

References Cited

UNITED STATES PATENTS 3,244,974   4/1966   Domin _____ 324—43 X

RUDOLPH V. ROLINEC, Primary Examiner

A. E. SMITH, Assistant Examiner

U.S. Cl. X.R.

307—245